Oct. 26, 1926.

W. H. ZORGER 1,604,213

LENS FOR HEADLIGHTS

Filed March 14, 1922      5 Sheets-Sheet 1

Inventor
W.H. Zorger,
per
Cushman, Bryant & Varley
Attorneys

Oct. 26, 1926.
W. H. ZORGER
1,604,213
LENS FOR HEADLIGHTS
Filed March 14, 1922  5 Sheets-Sheet 2
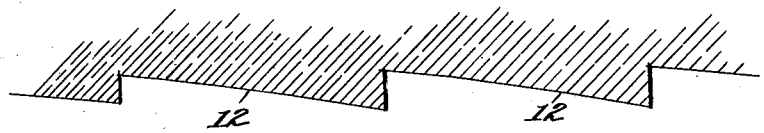
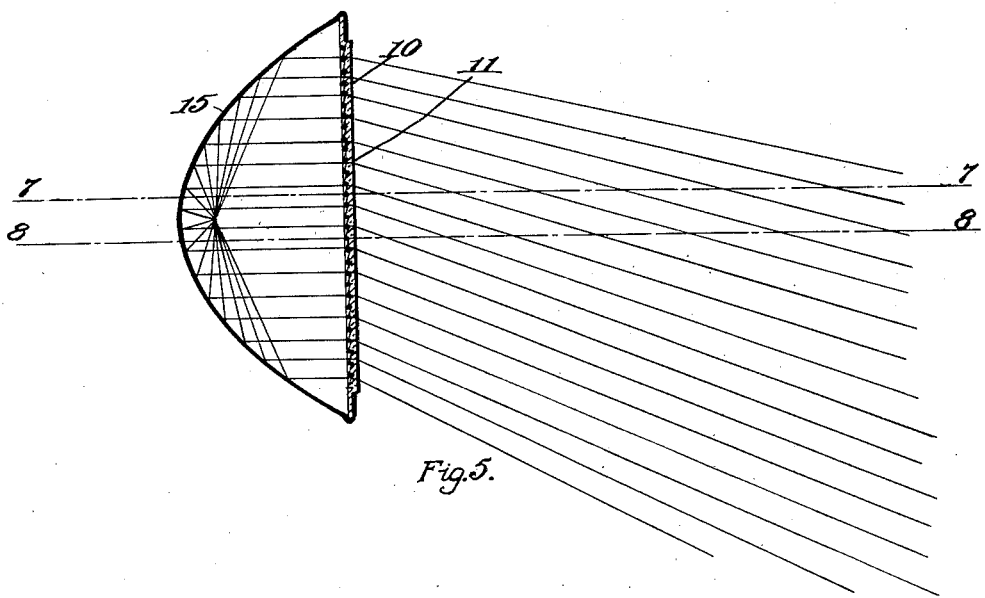
Fig.5.
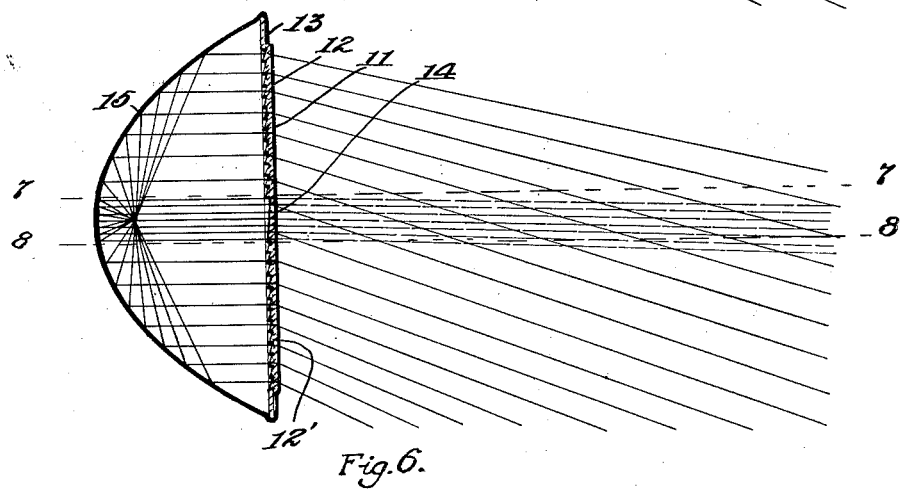
Fig.6.
Inventor
W.H. Zorger, Oct. 26, 1926.

W. H. ZORGER 1,604,213

LENS FOR HEADLIGHTS

Filed March 14, 1922  5 Sheets-Sheet 4

Inventor
W.H. Zorger,

Oct. 26, 1926.

W. H. ZORGER 1,604,213

LENS FOR HEADLIGHTS

Filed March 14, 1922      5 Sheets-Sheet 5

Inventor
W.H. Zorger,
per Cushman Bryant Wooley
Attorneys

Patented Oct. 26, 1926.

1,604,213

UNITED STATES PATENT OFFICE.

WILLIAM H. ZORGER, OF CHAMPAIGN, ILLINOIS.

LENS FOR HEADLIGHTS.

Application filed March 14, 1922. Serial No. 543,541.

The present invention relates to improvements in lenses for headlights such as used with automobiles, locomotives and other vehicles.

More particularly the invention is an improvement upon lenses for this purpose of the type to which my prior Patent No. 1,348,618, granted August 3, 1920, refers.

Like the lens of my aforesaid earlier patent, the subject matter of the present invention is adapted to provide, when associated with a headlight in which the lamp filament is positioned substantially at the focal center of the reflector, two superposed downwardly directed half cones of light and by relative adjustment between the lamp and reflector, to position the filament in advance or in rear of said focal point, one or the other of said half cones is converted into a "spot" light in which all of the rays thereof extend substantially parallel.

The particular object of the present invention is to increase the distance of the illuminated area of the roadway directly in front of the vehicle when the lamp filament is in center focus with relation to the reflector.

With the construction disclosed by my aforesaid earlier patent, owing to the fact that the rays of light issue or pass from the lens in circles horizontally, outwardly and downwardly, there is a minimum of light in the center of the two half cones produced with the source of illumination in center focus. That is, the rays passing through the central area of the disc are refracted laterally to such an extent as not to be available for illuminating the area which is directly in front and forward of the driver of an automobile; and the stronger the circular prisms of that patented construction are made, the more the center rays are weakened, and consequently the distance to which the illumination extends is shortened.

By my present invention I am enabled to utilize for direct illumination in front of the vehicle a large part of the light rays which by the patented construction were deflected laterally to such an extent as not to be available for this purpose.

According to the present invention the rays of light in a zone including the horizontal plane of the focal center of the lens and extending appreciably above and below that plane throughout the width of the lens are not refracted, except sufficiently to depress any upward inclined rays in such zone to the horizontal, while, with the lamp in center focus, all rays passing through the lens both above and below said zone are refracted downward.

The invention will be particularly described in connection with the accompanying drawings in which it is to be understood that many of the parts hereinafter referred to are shown more or less conventionally.

In said drawings:

Figure 3 is an edge view of the lens.

Figure 4 is an edge view, on an enlarged scale, of a portion of the lens.

Figures 5 and 6 are diagrammatic vertical sectional views of headlights, including lenses of the form of my prior Patent No. 1,348,618, and the present invention, respectively, showing the action of the lens upon the light rays with the lamp in center focus.

Figure 1:
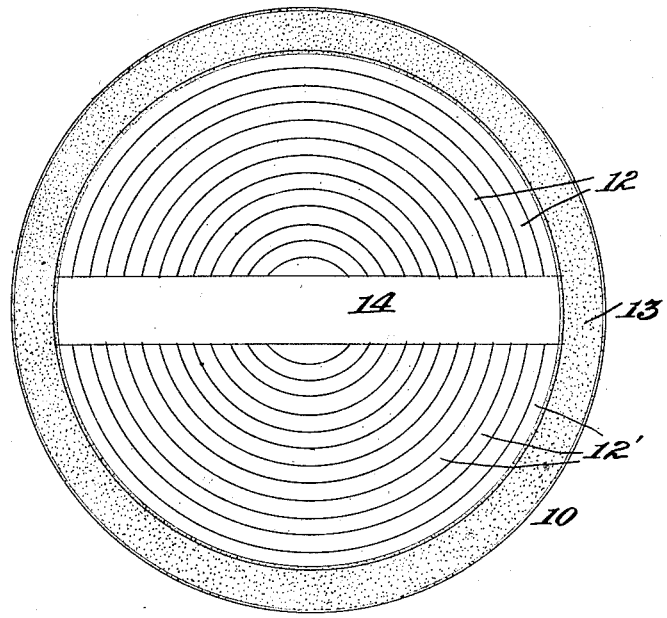
Figure 1 is an inside elevation of a headlight lens constructed in accordance with the present invention.
Figure 2:
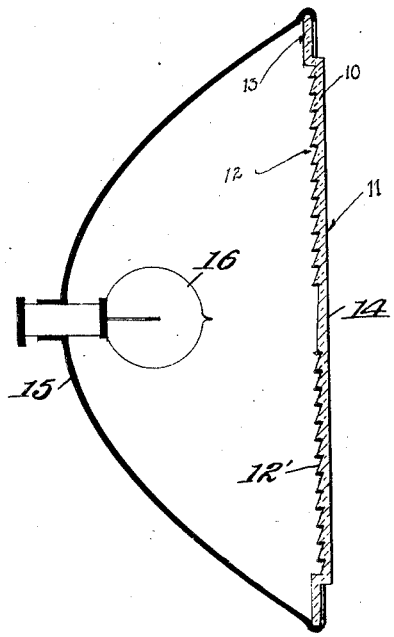
Figure 2 is a vertical sectional view through a headlight provided with the improved lens.
Figure 7:
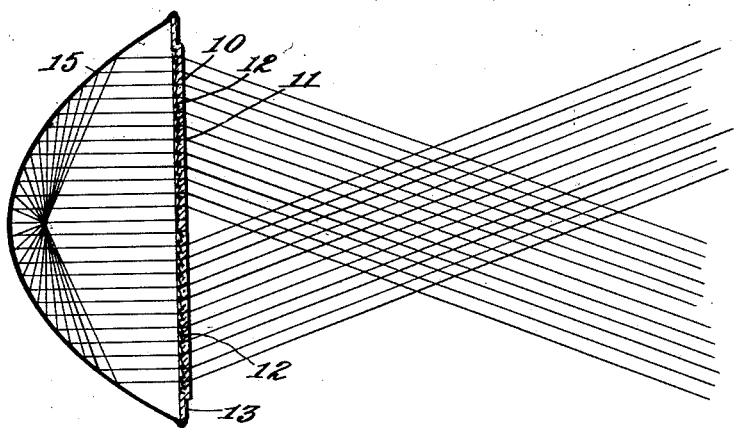
Figure 7 is a diagrammatic horizontal section, substantially on the line 7—7 of Figures 5 and 6.
Figure 8:
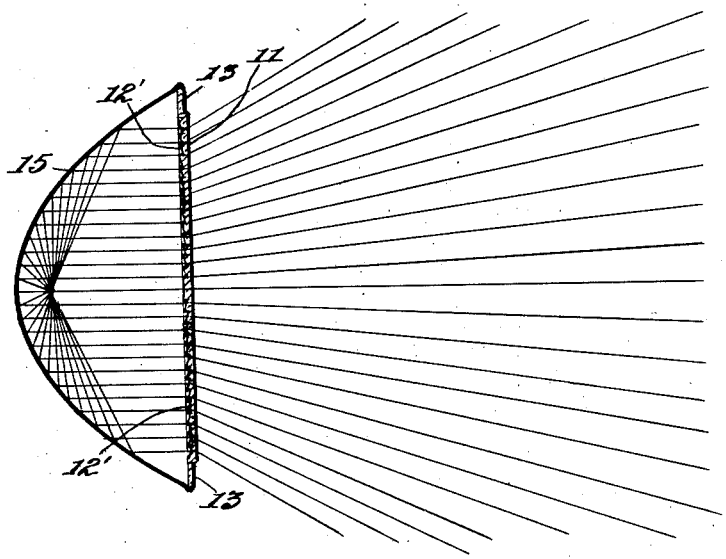
Figure 8 is a diagrammatic horizontal section on the line 8—8 of Figures 5 and 6.
Figure 9:
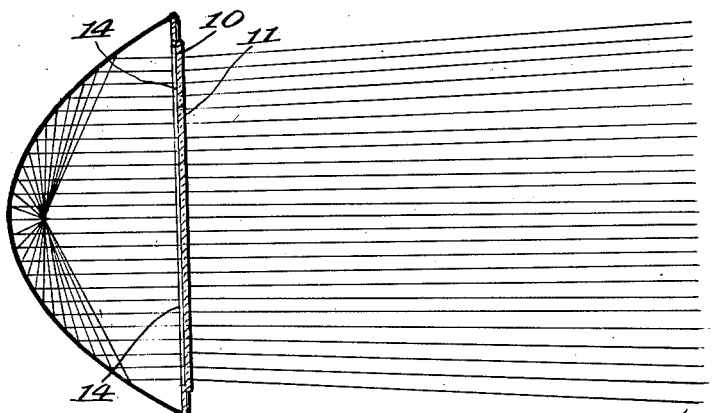

Figure 9 is a view similar to Figures 7 and 8 taken on a line substantially midway between the lines 7 and 8 of Figure 6, or through the "neutral zone" of the improved lens.

Figure 10:
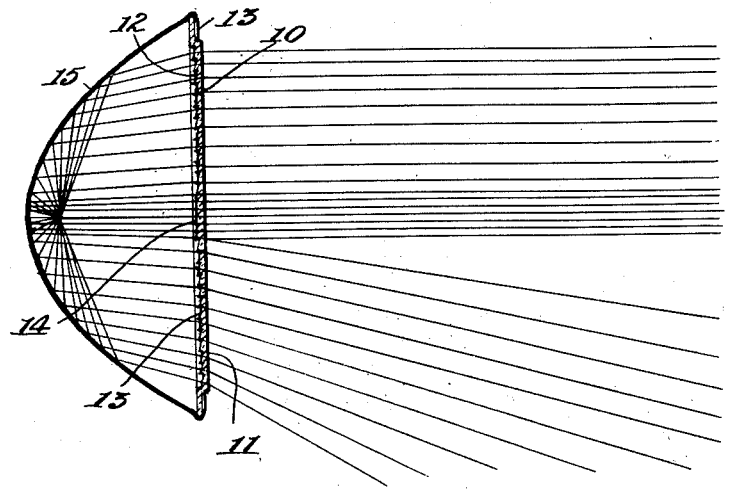

Figure 10 is a diagrammatic vertical section showing the deflection of rays when the source of illumination is slightly in rear of the focal center.

Figure 11:
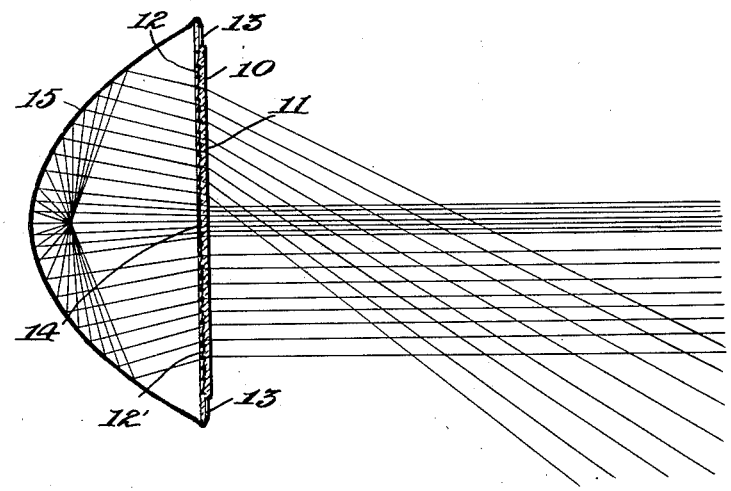

Figure 11 is a similar view with the source of illumination in advance of the focal center.

Figure 12:
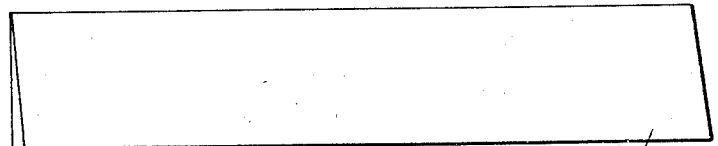

Figure 12 is a diagrammatic view of the "neutral zone" of the improved lens detached.

Figure 13:
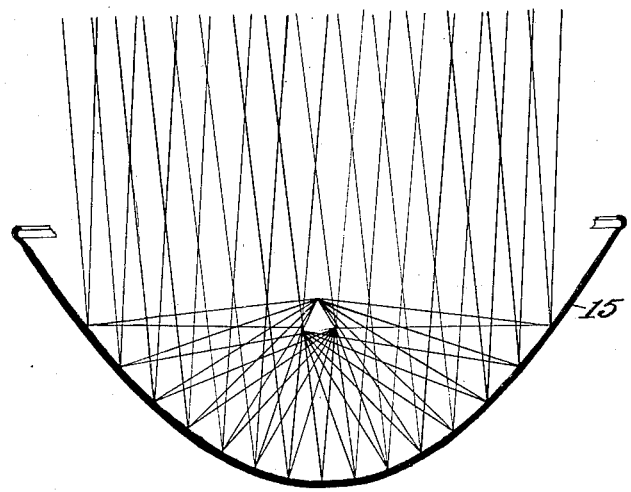

Figure 13 is a diagrammatic horizontal section of a parabolic reflector and a V-shaped electric lamp filament, the latter being on an enlarged scale, and arranged with the area between its members in the horizontal plane including the focal point of the reflector.

Figure 14:
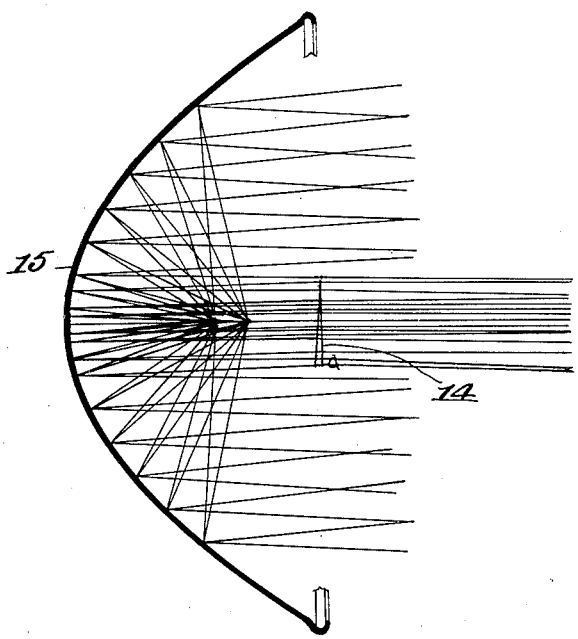

Figure 14 is a vertical diagram of the reflector and filament shown in Fig. 13.

Referring to the drawings, in the several figures of which like parts are designated by similar reference characters, 10 indicates the improved lens preferably, though not necessarily, having one face 11 made as a plane surface. To prevent accumulation of dust, etc., the plane surface 11 of the lens is preferably, though not necessarily, arranged outward and the opposite face is so formed as to provide two series of refracting elements 12, 12′ which are, respectively, located above and below a "neutral zone" 14. This "neutral zone," which is so formed as to have refracting elements 12, 12′, separated by it, includes the horizontal plane containing the center of the disc 10 and extends for an appreciable distance above and below such plane.

As shown, the refracting elements 12, 12′ are of substantially the form of those of my aforesaid Patent No. 1,348,618. That is, each element is of curved form, all of them being concentric with a common center, and each being of prismatic form in transverse section.

As in my earlier construction, the several elements are so arranged that the bases of the prisms of those in the series 12, or all that are above the neutral zone 14, are directed downward or toward the center of the disc, whereas the bases of the prisms of all of the elements 12′ are directed toward the circumference of the disc and their apices directed toward the zone 14 or center of the lens.

To avoid the danger of the formation of dark rings or circles on the road bed and to insure an even spread of light, it is preferred to form the inner surfaces of the refracting elements 12, 12′, slight curved, the arc of curvature depending upon the amount of spread or diffusion of the light rays that it is desired to obtain.

The width of each refracting element 12, 12′, may vary with lenses of different diameters, but all of them will be substantially uniform in each particular lens. The depth and exact curvature of the inner faces of the elements 12, 12′, may be slightly varied throughout the series so that the elements will gradually increase in basic strength from the periphery of the lens field over an annular area of approximately 1″ in width toward the center of the disc, the maximum strength of said elements, if of pure prismatic form and of about 1/4″ width, seldom exceeding .025″. If the elements are of curved or cylindrical form, the bases thereof will vary more or less, according to the degree of curvature and the extent to which it is desired to spread the rays passing therethrough.

It is preferred to form the greater part of the lens field with elements having the inner surface curved on the arc of a circle, said arc being made ordinarily of a 6″ curve, but may be made smaller or larger, according to the extent of spread and diffusion that is necessary or desired. These curved cylinders will have a basic strength of .025″ plus the additional cylinder, giving together a base of .035″ approximately, according to the functions desired. The prism dimensions above given are dependent on the prisms having a width of 1/4″. The peripheral elements of the lens field, which may be pure prisms, may have a basic strength of .0075″ at the edge of the lens field, and gradually increasing so that within 1″ of such edge, they will attain the maximum strength of any prismatic element which, as above noted, will rarely exceed, when pure prisms are used, a basic strength of .025″.

Toward the center of the lens the prisms may be lighter, since the vertical rays near the center of the lens are more nearly horizontal and, of course, should not be so strongly refracted as rays issuing from that portion of the reflector at right angles to the filament. However, said inner faces of all of the elements will be substantially parallel and throughout the entire light emitting area of the disc outside of the aforesaid "neutral zone". Preferably, the lens field does not extend to the periphery of the disc, but the latter is provided with an annular peripheral band 13, the surface of which is stripped so as to diffuse the light passing therethrough without exerting any material refracting effect on the rays.

In the drawings the improved lens is shown as arranged across the open end of a parabolic reflector 15 and an electric lamp bulb 16 is employed as the source of illumination. As the reflector and source of illumination may, of course, be of various specific constructions, sizes, etc., these parts are shown merely conventionally. In the diagrammatic views, particularly Figures 13 and 14, I have illustrated the type of filament which is at present most favored by automobilists, namely, a V-shaped filament arranged with the area between its members in the horizontal plane including the focal point of the reflector.

In headlights of the type illustrated, it is possible to arrange the source of illumination substantially at the focus of the reflector or slightly in rear or advance of such focus. If the filament is positioned substantially at the focus of the reflector, it is impracticable to use a plain glass plate at the front of the reflector, for the reason that with a filament of the length commonly employed the spread of light rays would produce a "spot light" effect and would not be spread sufficiently to illuminate the roadway adjacent or for a considerable distance in front of the vehicle. It has been the common practice, therefore, to arrange the filament slightly back of the focus of the reflector so as to spread the rays forming a cone of light or slightly in advance of said focus which will produce a similar cone of light, but in which the rays will be crossed, whereas when the filament is in rear of the focal point, the cone of light will be formed by directly reflected rays.

With the construction disclosed by my aforesaid Patent No. 1,348,618, when the filament is positioned at the real focus of the reflector, there are produced two even half cones of light, the upper exactly fitting into the lower, or being exactly superimposed on the lower half cone; but as the refracting elements of that construction intersected or met at the horizontal plane including the center of the lens certain of the rays were spread laterally to such an extent that they were not available for illuminating the road in front of the vehicle. By the present improvements in which the rays passing through the zone 14 are not spread laterally, such rays are available for increasing the direct illumination of the road, and the area illuminated extends for a greater distance from the headlight. The rays which pass through the zone 14 of my improved lens are, therefore, utilized for increasing the distance of the area of the roadway illuminated, and this has been found to be a very important feature.

As previously pointed out, the zone 14 of the improved lens is so shaped that, if it exerts any refracting power whatever, such power is less than that of any of the elements 12, 12'. Such zone is so shaped in cross section that it will merely act to refract to horizontal any upwardly inclined rays that may strike it. Such zone approximates 16% of the entire reflecting surface of the lens, and, as previously pointed out, is of material assistance in increasing the distance over which the illumination will extend from that which is secured with my patented construction. The improved lens provides in effect a "spot light" through the zone including the horizontal plane of the center of the lens and for deflecting downward all of the rays which pass through the two series of refracting elements 12, 12', respectively, above and below said zone. A comparison of Figures 5 and 6 will graphically show the difference in which the rays are refracted downward by the lens of the Patent No. 1,348,618, and the present invention. As shown clearly in Figure 6, while all of the rays passing through the refracting elements 12, 12' are directed downward, those passing through the zone 14 are substantially horizontal for a considerable distance in advance of the headlight, and, therefore, increase the illumination immediately in front of the vehicle which, with the construction shown in Figure 5, is somewhat reduced, owing to the lateral spread thereof by those sections of the refracting elements which meet at the horizontal central line of the lens.

Figures 7 and 8 illustrate in plan the lateral refraction of the rays passing through the sections 12, 12', in both my earlier construction and the present improved lens, while Figure 9 shows that the rays passing through the "neutral zone" 14 have a very limited lateral spread, and, therefore, these rays are effective for securing a maximum illumination of the road directly in front and for a considerable distance in advance of the vehicle. It will be understood that in all of the views, 5 to 9 inclusive, it is assumed that the source of illumination is substantially at the center focus of the reflector. By effecting relative adjustment between the source of illumination and the reflector, it is possible to cause the rays passing through either the upper or lower series of refracting elements to produce a "spot light" effect, as explained in my former patent. For example, Figure 10 illustrates the rays produced by my improved lens when the lamp filament is positioned slightly in rear of the focal center, and Figure 11 is a similar illustration of the condition produced when said filament is adjusted to a position slightly in advance of the focal center.

Figure 12 illustrates the cross sectional form of the "neutral zone" of the improved lens when this is given such a form as to refract to horizontal any upwardly inclined rays passing therethrough. It will be seen that this zone is in the form of a very low power prism, the apex of which is directed upward. In practice, the base of this prism may be from 1/100" to 2/100" in thickness, and if said zone 14 is approximately one inch in width, or height, it will have the form of a prism from 1° to 3° power.

In Figures 13 and 14 I have illustrated the relative spread or deflection of the rays of light from a V-shaped filament by the reflector. The filament illustrated is considerably larger than those actually employed so as to more clearly illustrate the action of the reflector on the rays of light. It will be noticed that the bundles of rays reflected by the V-shaped filament, when this filament is correctly positioned, in the head lamp or reflector, i. e., with the area between its members in the horizontal plane of the reflector, differ greatly in spread through the respective zones of the reflector. In Figure 13 it will be observed the ray bundles have the greatest divergence at the center of the reflector and gradually decrease in divergence from the the center toward the periphery, while, as is shown by Figure 14, through the vertical zone, owing to the fact that the thin wire is all that reflects exactly at the center of the reflector, the bundles of rays are least divergent at the center, gradually increasing from the center of the reflector through this vertical zone until at the lateral plane of the reflector through its focal point, or at right angles to the filament, these bundles attain their greatest divergence, and they slightly decrease again toward the periphery. Owing to the shape of the V-shaped filament and the correct position thereof in the reflector, it is possible to construct a lens having an appreciable neutral zone through the horizontal center of the lens, and if so desired, conserve the light passage therethrough for distance, by not increasing its spread and only deflecting it sufficiently as to bring all upwardly inclined rays to at least horizontal. Figure 14 shows that even with the enlarged filament shown in Figures 13 and 14, only a very few of the rays striking the "neutral zone" will have any tendency to an upward or downward spread, and by giving this zone the cross sectional form described, any upwardly inclined rays striking the same will be depressed to or below horizontal.

As the "neutral zone" does not include any elements acting to spread the rays laterally, the improved lens will, as before described, produce an increased illumination of the roadway in advance of the vehicle and, therefore, be practically superior to constructions heretofore proposed in which all of the rays were spread laterally.

If a perfect filament is employed and the same is properly located, it will not be necessary to tilt the headlight from a truly vertical position. As the filaments are often longer than those for which the parts are properly proportioned and at times irregular and imperfect, it has been found necessary, in practice, to tilt the headlights forward so that no reflected light would rise above the horizontal plane, including the center of the lamp. It is evident that the amount of tilt depends on the kind of filament employed in the illuminating bulb, and as to whether or not it is properly located with reference to the focal point of the reflector. If a V-shaped filament, not exceeding 1/10" in length, is used and this is properly located with reference to the reflector focus, no tilt would be necessary with a lamp provided with the improved lens, but if the filament is not of proper character and the parts are not otherwise properly proportioned, some slight tilting may be advisable.

It is believed that the operation and the advantages of the invention will be readily understood and appreciated from the foregoing description.

It is to be understood, of course, that there can be considerable variation in many of the details shown on the drawings and that the latter are to be considered as merely illustrative of the invention, rather than limiting, and that except as the details shown are specifically referred to in the claims, the latter are to be considered as including equivalent but slightly different arrangements.

I claim:

1. The combination with a parabolic reflector, of a substantially V-shaped illuminating filament positioned within the reflector with the area between its members arranged horizontally and in the plane including the focal point of the reflector, and a lens comprising a disc having a horizontal, substantially non-refracting, zone including the center of the disc and the horizontal plane of the filament, and duplicate series of ray-refracting elements arranged, respectively, above and below said non-refracting zone, each of said elements being adapted to deflect rays of light passing therethrough both laterally and vertically.

2. The combination with a parabolic reflector, of a substantially V-shaped illuminating filament positioned within the reflector with the area between its members arranged horizontally, and in the plane including the focal point of the reflector, and a lens having an annular, marginal, zone and a horizontal zone, including the center of the disc and the horizontal plane of the filament, both of substantially non-refracting form in cross section, the zones intermediate said marginal and horizontal zones being of such cross sectional form as to refract rays of light passing therethrough.

3. A lens for vehicle headlights having a substantially horizontal diametrically disposed area, of substantially non-refracting cross sectional form, a plurality of refracting elements arranged in groups, respectively above and below said horizontal area, the elements in each group being arc-shaped and concentrically positioned, and an annular marginal area of substantially non-refracting cross sectional form surrounding said refracting areas.

In testimony whereof I have hereunto set my hand.

WILLIAM H. ZORGER.